March 1, 1927.
M. J. MOORE
1,619,527
TRAP NEST ATTACHMENT
Filed Oct. 4, 1922
2 Sheets-Sheet 2
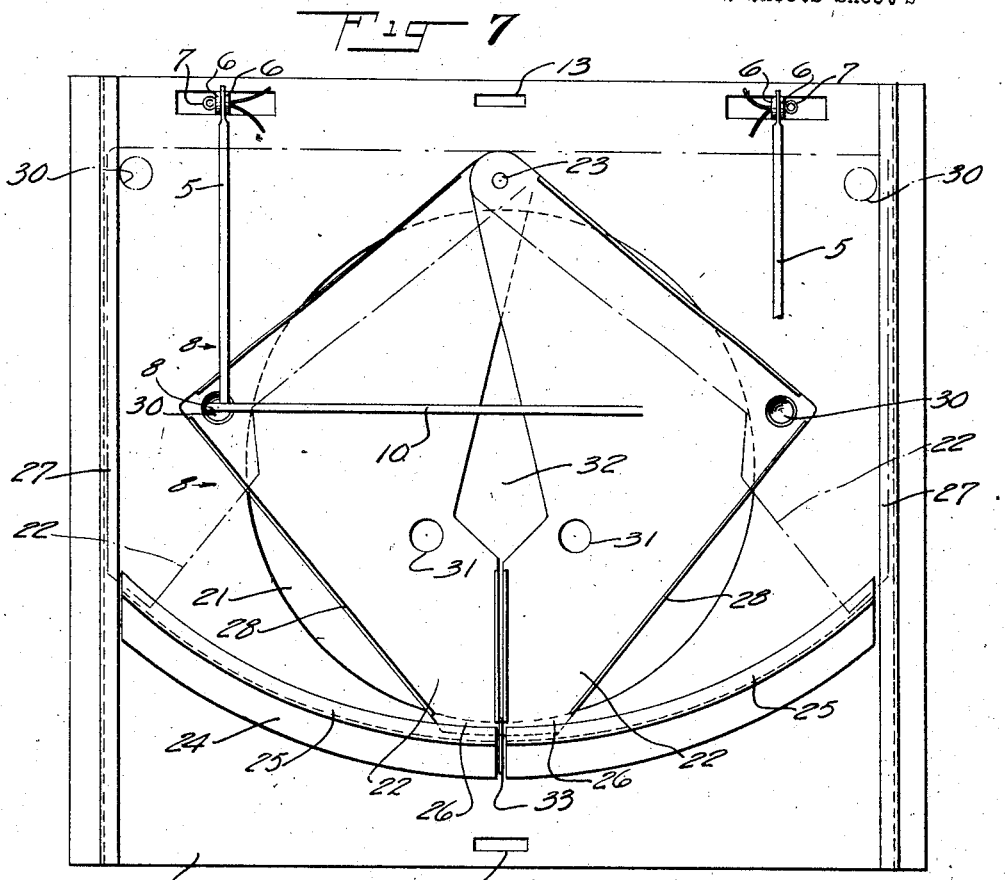
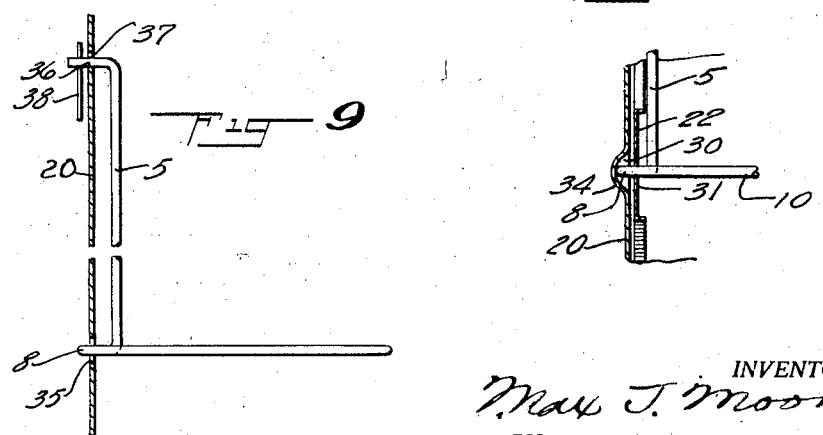
INVENTOR
Max J. Moore
BY John D. Morgan
ATTORNEY Patented Mar. 1, 1927.

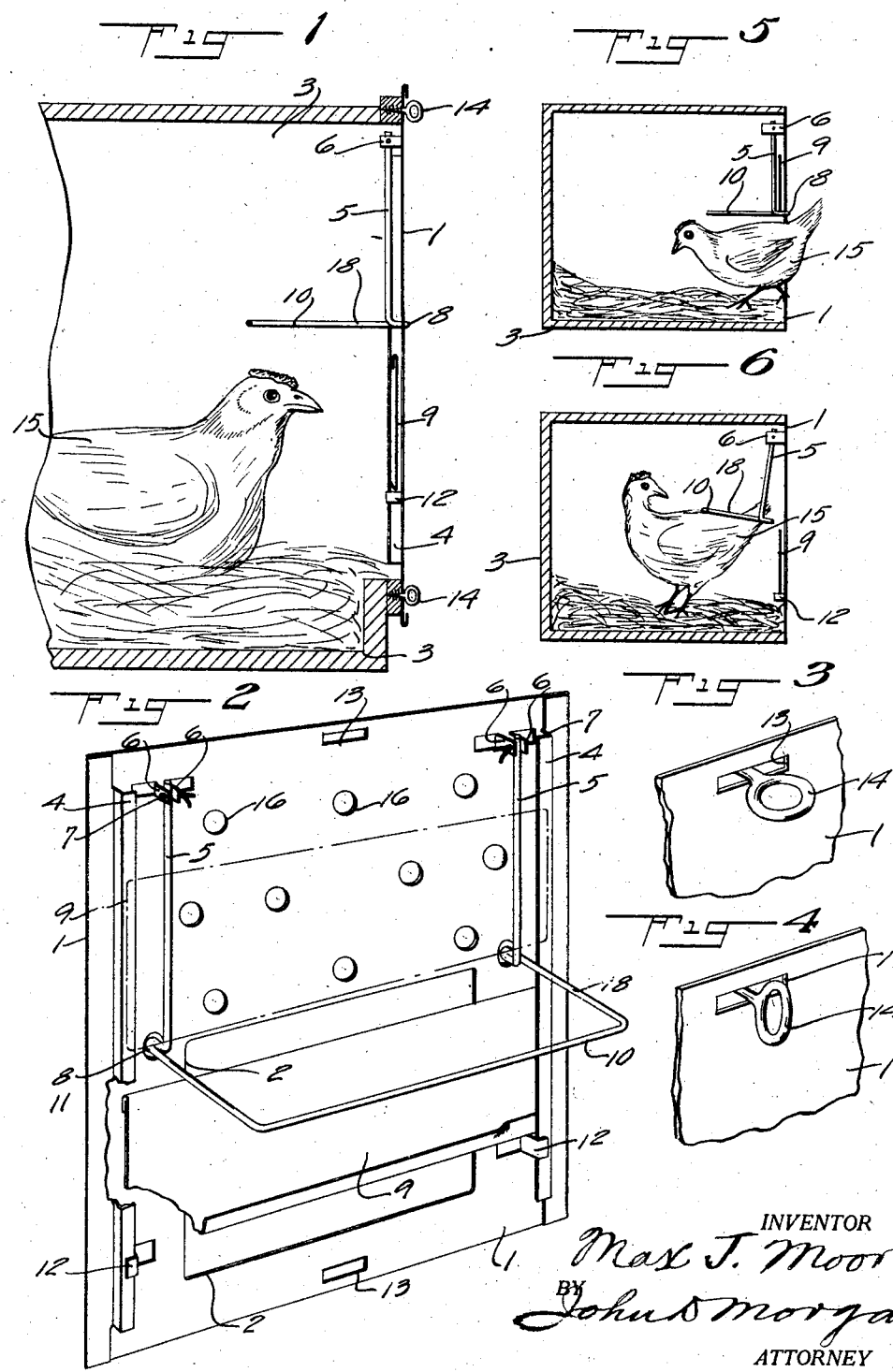

1,619,527

UNITED STATES PATENT OFFICE.

MAX J. MOORE, OF NEWARK, NEW JERSEY, ASSIGNOR TO WALTER H. COLLINS, OF SUMMIT, NEW JERSEY.

TRAP-NEST ATTACHMENT.

Application filed October 4, 1922. Serial No. 592,320.

The invention relates to a novel, simple and economical trap nest attachment which is preferably struck up from sheet metal and can be attached to any nest.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, improvements, and articles of manufacture, herein shown and described.

The accompanying drawings, referred to herein and constituting a part hereof, illustrate different embodiments of the invention, and together with the description, serve to explain the principles of the invention.

Of the drawings:—

Fig. 1 is a vertical section through a nest, equipped with my trap nest attachment, showing a hen within the nest;

Fig. 2 is a perspective rear view, partly broken away, for purposes of illustration;

Fig. 3 is a fragmentary detail view, showing one manner of attaching the attachment to a nest;

Fig. 4 is a detail view, similar to Fig. 3, showing the screw eye turned 90 degrees so as to removably hold the attachment in place;

Fig. 5 is a vertical, diagrammatic view, showing how the hen enters the nest;

Fig. 6 is a diagrammatic view, similar to Fig. 5, showing how the hen operates the trigger arm;

Fig. 7 is a perspective rear view of another form;

Fig. 8 is a detail vertical section on line 8—8 of Fig. 7;

Fig. 9 is a detail vertical section of another form.

My invention relates to trap nests and more particularly to a simple and inexpensive attachment which can be fastened practically to any nest at minimum expense to make a trap nest.

In the form of my invention, which I have shown by way of illustration, my trap nest attachment consists of a plate 1, preferably stamped from sheet metal, and provided with an opening 2, which becomes the entrance to the nest 3. I provide the plate 1 with vertically extending guides or tracks 4, 4 secured to the plate in any suitable manner, preferably by being integral therewith.

Near the upper end of the plate 1, I mount, in any suitable manner, a trigger 18. Preferably this trigger is mounted by punching out the ears 6, 6, as shown in Fig. 2, and pivotally securing the arms 5, 5 of the trigger 18 to these ears 6, 6 by passing cotter pins 7, 7 through openings in the arms 5, 5. For ease and cheapness of manufacture, I preferably form the trigger 18 from a bent wire having the arms 5, 5 and the trigger arm 10, connecting said arms. The trigger rests 8, 8 are formed by bending back the wire on itself to form supports for the vertically sliding door or trap 9. These trigger rests 8, 8 are so formed that they extend through the openings 11, 11 formed in the plate 1 and protrude a slight distance beyond the face of the plate 1, so that either one or both trigger rests 8, 8 can be operated by a person with his thumb without putting his hand within the opening 2 of the plate.

Near the bottom of the plate 1, I form stops in any suitable manner to engage and limit the downward movement of the door or trap 9. I preferably form these stops by cutting out lugs 12, 12 from the plate 1 and bending them as shown to engage with the vertical guides or tracks 4, 4.

My trap attachment may be secured to the nest in any suitable manner. Preferably I provide the plate 1 with one or two elongated slots 13, 13 to cooperate with the screw eyes 14, 14, as shown in Figs. 1, 3 and 4.

In the operation of my device, the screw eyes 14, 14, are secured at the bottom and top of the nest 3 and brought into the position shown in Fig. 3. The plate 1 is then brought in front of the nest 3 so that the slots 13, 13 will be made to register with the screw eyes 14, 14. As soon as the plate is pressed home the screw eyes 14, 14 are turned, as shown in Fig. 4, when the plate will be securely, but removably, held in position. The attachment is such, that it can be readily removed when it is desired to clean the nest.

To position the parts, pressure is applied by the thumb or otherwise upon one or both of the bent trigger rests 8, 8, which protrude through the openings 11, 11. This will rock the trigger permitting the other hand to be used to lift the trap or door 9 into its operative elevated position, shown in dotted lines in Fig. 4, and more or less diagrammatically in Fig. 5. The hen 15 will enter freely into the nest 3 through the opening 2, as shown diagrammatically in Fig. 5. After she has gotten well within the nest 3, she will engage with the trigger arm 10 and cause the trigger arms 5, 5 of the trigger 18 to rock upon the cotter pins 7, 7. This will cause the trigger rests 8, 8 to move from under the trap or door 9, as shown diagrammatically in Fig. 6, which will permit the trap or door to fall within the guides or tracks 4, 4 and engage with the stops 12, 12 as shown for example in Fig. 1. It is impossible for the hen to leave the nest until the person in charge operates the trigger 18 by pressing with his thumb upon one of the protruding portions of the trigger rests 8, 8 and at the same time lifting the trap or door 9, which will again set the trap, ready for the next hen, Fig. 5.

Preferably, the trap or door 9 does not completely close the opening 2, so that sufficient ventilation will be insured to the hen while in the nest. This ventilation may be increased by punching holes 16, 16 within the plate 1.

I have shown another form of my invention in Figs. 7 and 8. In this form, the plate 20 is provided with an opening 21, which is preferably, though not necessarily, circular and becomes the opening for the nest when the plate is secured in position by means of the slots 13, 13 and screw eyes 14, 14, see Figs. 3 and 4.

In this form, I use one or more pivoted traps or doors, two being preferably employed and pivoted on the rivet 23.

Near the bottom of the plate 20, I secure a track 24 formed in the arc of a circle, the center of which is the rivet 23, upon which the two traps or doors 22, 22 are pivoted. This track has a lip or flange 25 between which and the plate 20, the ends 26, 26 of the traps or doors 22, 22 are guided and held from displacement. I also preferably provide the plate 20 with vertical flanges 27, 27 behind which the sides 28, 28 of the traps or doors 22, 22 are held when in their open position.

The plate 20 is provided with a trigger 18 having trigger rests 8, 8 and a connecting trigger arm 10, the same as in the form of my invention previously described. The trigger arms 5, 5 are pivotally secured to the plate 20 in any suitable manner as for example by the ears 6, 6 and cotter pins 7, 7.

The pivoted traps or doors 22, 22 are provided with locking means to cooperate with the trigger 18. I have shown each trap or door provided with two holes 30 and 31. The lower holes 31, 31 are engaged by the trigger rests 8, 8 when the doors or traps 22, 22 are swung up into their open position, as shown in dotted lines in Fig. 7.

When a hen, as 15, enters the nest she operates the trigger arm 10, causing the trigger 18 to swing on the cotter pins 7, 7 out from the plate 20. Very little outward movement of the trigger rests 8, 8 will disengage them from the holes 31, 31 and permit the doors or traps 22, 22, by their own weight, to swing down into the position shown in full lines in Fig. 7.

To prevent the hen swinging the trap or doors 22, 22 after they are in their closed position, shown in full lines in Fig. 7, I may employ any suitable locking means to keep the doors or traps from being opened. I have shown for example the doors or traps 22, 22 provided with other holes 30, 30, which, when the trap is sprung register and engage with the trigger rests 8, 8 and serve to lock the doors or traps 22, 22 in their closed position, as shown in Fig. 7.

To release the hen from the nest and again set the trap, it is only necessary, in the form shown in Figs. 7 and 8, to insert a stick or other suitable member through the opening 32, to engage and lift the trigger arm 10 so that the trigger rests 8, 8 will free the holes 30, 30. This will permit the traps or doors 22, 22 to be again swung up into their open or set position, shown in dotted lines in Fig. 7.

To prevent either door or trap 22, 22 from swinging too far, I preferably provide a stop 33 in the track 24.

As shown in Figs. 7 and 8, the plate 20 is provided with two tits 34 (only one being shown in Fig. 8) to receive the ends of the trigger arms 8, 8.

I may, however, provide the plate 20 with holes 35, 35 (only one hole being shown in Fig. 9) to receive the trigger rests 8, which protrude through the plate 20. This will permit the trigger arms 8, 8, or either one of them, to be operated by the thumb of the chicken fancier the same as in the form shown in Figs. 1 and 2, except that in the form shown in Fig. 7 and Fig. 9 pivoted traps or doors are used instead of a sliding one. In the form shown in Fig. 9, I bend the end 36 of the arms 5, 5 (only one shown) and pass it through a hole 37 in the plate 20 and secure it by the cotter pins 38, 38. The trigger 18 of Figs. 1 and 2 may be mounted in this manner, if desired.

While I preferably employ two pivoted traps or doors 22, 22 it is, of course, to be understood that I may use one such door or trap.

The invention in its broader aspects it not limited to the specific trap attachments shown and described, but departures may be made therefrom within the scope of the accompanying claims without departing from the principles of the invention and without sacrificing its chief advantages.

What I claim is:—

1. A trigger mechanism for a trap nest, comprising a pair of vertically extending arms pivoted at their upper ends, closure-engaging shoulders carried at the lower ends of the vertical arms, and a horizontally extending arm connecting the vertical arms extending across the nest opening in a position to be engaged by the hen.

2. A trigger mechanism for a trap nest provided with a gravity-actuated closure, comprising a pair of vertical arms pivoted at their upper ends, a horizontally extending arm supported by the vertical arms out of the plane of the vertical arms and well within the nest, and a pair of shoulders for engaging with the closure at two laterally spaced points.

3. A trigger mechanism for a trap nest provided with a gravity operated closure, comprising a pair of vertical arms pivoted at their upper ends, a pair of closure engaging shoulders at the lower ends of the vertical arms, inwardly and horizontally extending arms at the lower ends of the vertical arms, and a horizontally extending arm connected to the horizontal arms.

4. The combination in a trap nest attachment of a plate to fit over the front of a nest, one or more pivoted doors or traps, and trigger mechanism for controlling the trap or traps and adapted to be operated by contacting with a hen, said trigger mechanism also serving to lock the pivoted trap or traps in their closed position.

5. The combination in a trap nest attachment of a plate to fit over the front of a nest, one or more pivoted doors or traps, a circular track cooperating with the end or ends of the pivoted doors or traps, a trigger having means to hold the doors or traps in their open position, said trigger extending into the nest and adapted to be operated by a hen, said trigger also serving to lock the doors or traps in their closed position.

6. The combination in a trap nest attachment of a plate to fit over the front of a nest, one or more pivoted doors or traps, a circular track cooperating with the end or ends of the pivoted doors or traps, a trigger having means to hold the doors or traps in their open position, said trigger extending into the nest and adapted to be operated by a hen, and means cooperating with the trigger to permit the trigger to hold the doors or traps in their closed position.

7. A trigger mechanism for a trap nest comprising a pair of vertically disposed L-shaped arms, pivoted at their upper ends on opposite sides of the nest opening, with their horizontal members extending inside the nest, and a substantially horizontal arm connecting the ends of the horizontal members of the L-shaped arms, in a position to contact with the back of hen after she is well inside the nest.

In testimony whereof, I have signed my name to this specification.

MAX J. MOORE.